US012264519B2

(12) United States Patent
Hodge

(10) Patent No.: US 12,264,519 B2
(45) Date of Patent: Apr. 1, 2025

(54) TAMPER RESISTANT HASP

(71) Applicant: Brandeis University, Waltham, MA (US)

(72) Inventor: Donald Andrew Hodge, Hudson, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 172 days.

(21) Appl. No.: 18/086,908

(22) Filed: Dec. 22, 2022

(65) Prior Publication Data

US 2023/0212895 A1 Jul. 6, 2023

Related U.S. Application Data

(60) Provisional application No. 63/296,317, filed on Jan. 4, 2022.

(51) Int. Cl.

| | |
|---|---|
| ***E05C 19/08*** | (2006.01) |
| ***E05B 65/46*** | (2017.01) |
| ***E05B 65/48*** | (2006.01) |
| ***E05B 67/06*** | (2006.01) |
| ***E05B 67/38*** | (2006.01) |

(52) U.S. Cl.

CPC .............. *E05C 19/08* (2013.01); *E05B 65/46* (2013.01); *E05B 65/48* (2013.01); *E05B 67/06* (2013.01); *E05B 67/383* (2013.01); *E05Y 2800/674* (2013.01); *E05Y 2900/20* (2013.01)

(58) Field of Classification Search

CPC .......... E05C 19/08; E05B 65/46; E05B 65/48; E05B 65/5284; E05B 67/383; E05B 67/06

See application file for complete search history.

(56) References Cited

U.S. PATENT DOCUMENTS

| | | | |
|---|---|---|---|
| 3,858,923 | A | 1/1975 | Bunn |
| 4,345,448 | A | 8/1982 | Solomon |
| 4,486,057 | A | 12/1984 | Siwy |

(Continued)

FOREIGN PATENT DOCUMENTS

| | | | |
|---|---|---|---|
| WO | 2013058647 | A1 | 4/2013 |

OTHER PUBLICATIONS

International Search Report and Written Opinion; International Application No. PCT/US23/10026; International Filing Date Jan. 3, 2023; Date of Mailing May 3, 2023_6 pages_.

*Primary Examiner* — Christine M Mills
*Assistant Examiner* — Peter H Watson
(74) *Attorney, Agent, or Firm* — CANTOR COLBURN LLP

(57) ABSTRACT

A tamper resistant hasp having: a first member extending between a first inner end and a first outer end, the first member defining a first member outer boundary and has a mounting aperture located within the first member outer boundary; a second member that has: a first portion that extends between a second inner end and a joint end, the second inner end being pivotally coupled to the first inner end, the second member pivots relative to the first member so that in a first pivot position the first portion is against the first member and covers the mounting aperture, and in a second pivot position such that the mounting aperture is uncovered; and a second portion that extends away from the first portion at the joint end to a third end and having a shackle aperture located within the second portion outer boundary.

13 Claims, 8 Drawing Sheets

(56) References Cited

U.S. PATENT DOCUMENTS

| | | | | |
|---|---|---|---|---|
| 4,745,783 | A | 3/1988 | Poe | |
| 4,788,836 | A | 12/1988 | Poe | |
| 4,852,920 | A | 8/1989 | Deforrest | |
| 5,524,462 | A | 6/1996 | Loughlin | |
| 6,039,473 | A | 3/2000 | Bond | |
| 6,095,574 | A * | 8/2000 | Dean | E05C 1/002 292/284 |
| 6,601,413 | B1 | 8/2003 | Vito | |
| 6,708,532 | B2 | 3/2004 | Winland | |
| 8,740,319 | B1 * | 6/2014 | Davis | E05B 67/383 312/216 |
| 2004/0031297 | A1 | 2/2004 | Winland | |
| 2014/0111329 | A1 * | 4/2014 | Tearston | E05B 41/00 340/521 |
| 2014/0246871 | A1 * | 9/2014 | Lee | E05C 19/08 292/281 |
| 2019/0383070 | A1 | 12/2019 | Marchl | |
| 2020/0355003 | A1 * | 11/2020 | Berry | E05F 1/006 |

* cited by examiner

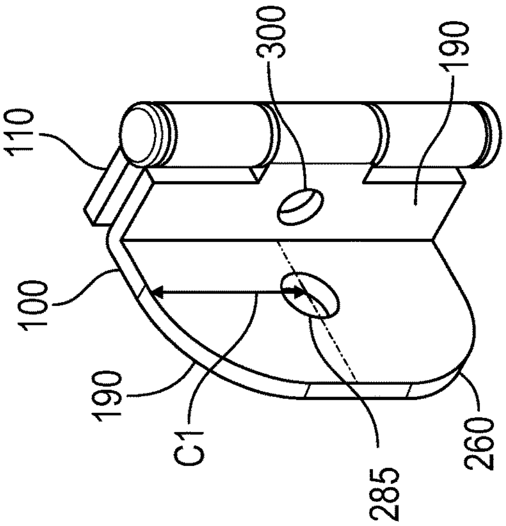
FIG. 4A
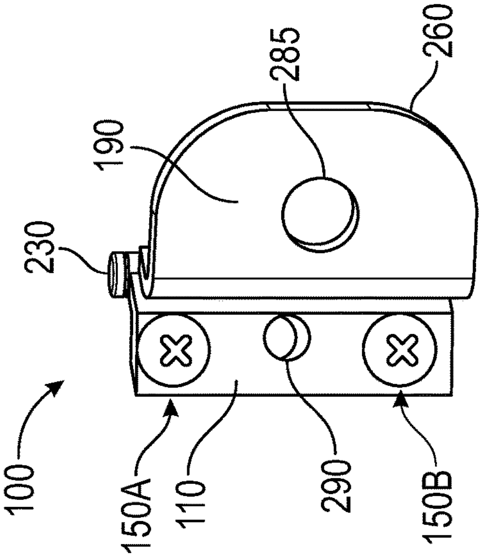
FIG. 4B
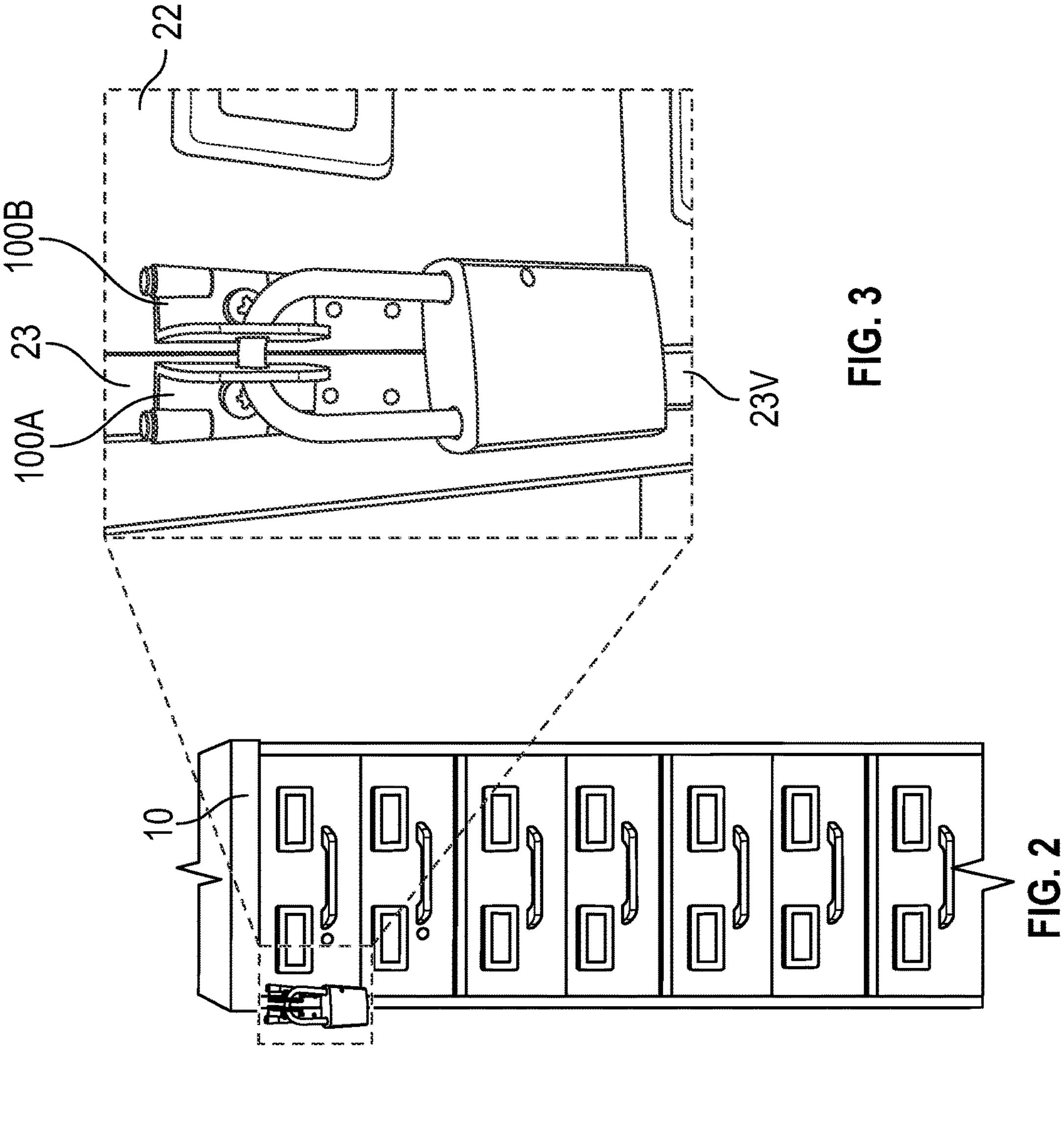
FIG. 3
FIG. 2

TAMPER RESISTANT HASP

CROSS-REFERENCE TO RELATED APPLICATIONS

This application claims the benefit of U.S. Provisional Application Ser. No. 63/296,317, filed Jan. 4, 2022, which is incorporated herein by reference in its entirety.

BACKGROUND

The disclosed embodiments relate to hasps and more specifically to a tamper resistant hasp for a file cabinet. Cabinet drawer hasps may secure contents within a cabinet drawer. Ideally, such hasps are tamper resistant to provide additional security to the contents in the cabinet drawer.

BRIEF SUMMARY

Disclosed is a tamper resistant hasp including: a first member that extends between a first inner end and a first outer end that are depthwise spaced apart from each other by a first distance, wherein the first member defines a first member outer boundary and has a mounting aperture located within the first member outer boundary; a second member that has: a first portion that extends between a second inner end and a joint end that are depthwise spaced apart from each other by the first distance, wherein the second inner end is pivotally coupled to the first inner end, wherein the second member is configured to pivot relative to the first member so that in a first pivot position the first portion is against the first member and covers the mounting aperture, and in a second pivot position the first member is at an angle to the first portion and the mounting aperture is uncovered; and a second portion that extends away from the first portion at the joint end to a third end, so that when the second member is in the first pivot position, the second portion extends away from the first member, wherein the second portion defines a second portion outer boundary and has a shackle aperture located within the second portion outer boundary.

In addition to one or more of the above disclosed aspects of the hasp, or as an alternate, the second portion extends perpendicularly away from the first portion at the joint end.

In addition to one or more of the above disclosed aspects of the hasp, or as an alternate, the first member is a first plate that is rectangular and has a first length that is greater than the first distance; and the second member is a second plate, wherein the first portion has a same length as the first member.

In addition to one or more of the above disclosed aspects of the hasp, or as an alternate, the second portion is D-shaped to define an elongate flat end at the joint end and wherein the third end of the second portion is arcuate.

In addition to one or more of the above disclosed aspects of the hasp, or as an alternate, the shackle aperture is aligned with a lengthwise center of the first member.

In addition to one or more of the above disclosed aspects of the hasp, or as an alternate, the first member has a first security aperture that is lengthwise aligned with the shackle aperture and offset from the mounting aperture; and the first portion of the second member has a second security aperture that is positioned to overlap with the first security aperture when the second member is in the first pivot position.

In addition to one or more of the above disclosed aspects of the hasp, or as an alternate, the first member has a plurality of the mounting apertures located within the first member outer boundary, wherein the plurality of the mounting apertures are spaced apart from each other and from the first security aperture so that in the first pivot position, the first portion of the second member covers the plurality of the mounting apertures.

In addition to one or more of the above disclosed aspects of the hasp, or as an alternate, the first inner end and the second inner end are pivotally coupled via a hinge.

In addition to one or more of the above disclosed aspects of the hasp, or as an alternate, the hinge is a piano hinge.

In addition to one or more of the above disclosed aspects of the hasp, or as an alternate, the hasp is formed of steel.

Further disclosed is a method of securing a cabinet, including: (i) obtaining a plurality of the hasps having one or more of the above disclosed aspects; (ii) securing a one hasp of the plurality of hasps to a front lip of the cabinet via: passing a shaft of a mounting fastener through the mounting aperture of the one hasp so that a head of the mounting fastener rests against the first member of the one hasp; pivoting the second member of the one hasp to the first pivot position, to thereby cover the head of the mounting fastener, and to align the first and second security apertures of the one hasp; passing a shaft of a security fastener through the first and second security apertures of the one hasp so that a head of the security fastener rests against the first portion of the second member of the one hasp; (iii) securing a another hasp of the plurality of hasps to an exterior facing front surface of a cabinet drawer via: passing a shaft of another mounting fastener through the mounting aperture of the another hasp so that a head of the another mounting fastener rests against the first member of the another hasp; pivoting the second member of the another hasp to the first pivot position, to thereby cover the head of the another mounting fastener, and to align the first and second security apertures of the another hasp; passing a shaft of another security fastener through the first and second security apertures of the another hasp so that a head of the another security fastener rests against the first portion of the second member of the another hasp; and (iv) passing a shackle of a pad lock through the shackle aperture of each of the hasps, to thereby block access to the heads of the security fasteners.

In addition to one or more of the above disclosed aspects of the method of securing the cabinet, or as an alternate, each of the mounting fasteners and security fasteners are self-taping metal screws.

Disclosed is a method of manufacturing a tamper resistant hasp, including: defining a first member to extend between a first inner end and a first outer end that are depthwise spaced apart from each other by a first distance, and to have a first member outer boundary and a mounting aperture located within the first member outer boundary; defining a second member to have: a first portion that extends between a second inner end and a joint end that are depthwise spaced apart from each other by the first distance, wherein the second inner end is configured to be pivotally coupled to the first inner end, wherein the second member is defined so that, when it is pivotally connected to the first member and in a first pivot position, the first portion is against the first member and covers the mounting aperture, and when it is in a second pivot position, the first member is at an angle to the first portion and the mounting aperture is uncovered; and a second portion that extends away from the first portion at the joint end to a third end, the second portion being defined so that when the second member is pivotally connected to the first member and disposed in the first pivot position, the second portion extends away from the first member, and the second portion is defined to have a second portion outer boundary and have a shackle aperture located within the second portion outer boundary; additively manufacturing the first member and the second member; and pivotally coupling the first member and the second member.

In addition to one or more of the above disclosed aspects of the method of manufacturing a tamper resistant hasp, or as an alternate, the first inner end and the second inner end are pivotally coupled via a hinge.

In addition to one or more of the above disclosed aspects of the method of manufacturing a tamper resistant hasp, or as an alternate, the first and second members are additively manufactured from steel.

In addition to one or more of the above disclosed aspects of the method of manufacturing a tamper resistant hasp, or as an alternate, the first member is defined to have a first security aperture that is lengthwise aligned with the shackle aperture and offset from the mounting aperture; and the first portion of the second member is defined to have a second security aperture that is positioned to overlap with the first security aperture when the second member is in the first pivot position.

In addition to one or more of the above disclosed aspects of the method of manufacturing a tamper resistant hasp, or as an alternate, the first member is defined to have a plurality of the mounting apertures located within the first member outer boundary, wherein the plurality of the mounting apertures are defined to be spaced apart from each other and from the first security aperture so that when the second member is pivotally connected to the first member and disposed in the first pivot position, the first portion of the second member covers the plurality of the mounting apertures.

In addition to one or more of the above disclosed aspects of the method of manufacturing a tamper resistant hasp, or as an alternate, the second portion is defined to extend perpendicularly away from the first portion at the joint end.

In addition to one or more of the above disclosed aspects of the method of manufacturing a tamper resistant hasp, or as an alternate, the first member is defined as a first plate that is rectangular and has a first length that is greater than the first distance; and the second member is defined as a second plate, such that the first portion has a same length as the first member.

In addition to one or more of the above disclosed aspects of the method of manufacturing a tamper resistant hasp, or as an alternate, the second portion is defined as being D-shaped such that it has an elongate flat end at the joint end and such that the third end of the second portion is arcuate.

BRIEF DESCRIPTION OF THE DRAWINGS

The present disclosure is illustrated by way of example and not limited in the accompanying figures in which like reference numerals indicate similar elements.

FIG. 2 is a front view of the file cabinet with two of the hasps mounted to it, and a padlock locking the cabinet via the hasps;

FIG. 3 is a detail of a portion of FIG. 2;

FIG. 4*a* is a perspective view of the hasp in a closed position;

FIG. 4*b* is a perspective view of the hasp in an opened position, with screws in the mounting apertures;

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
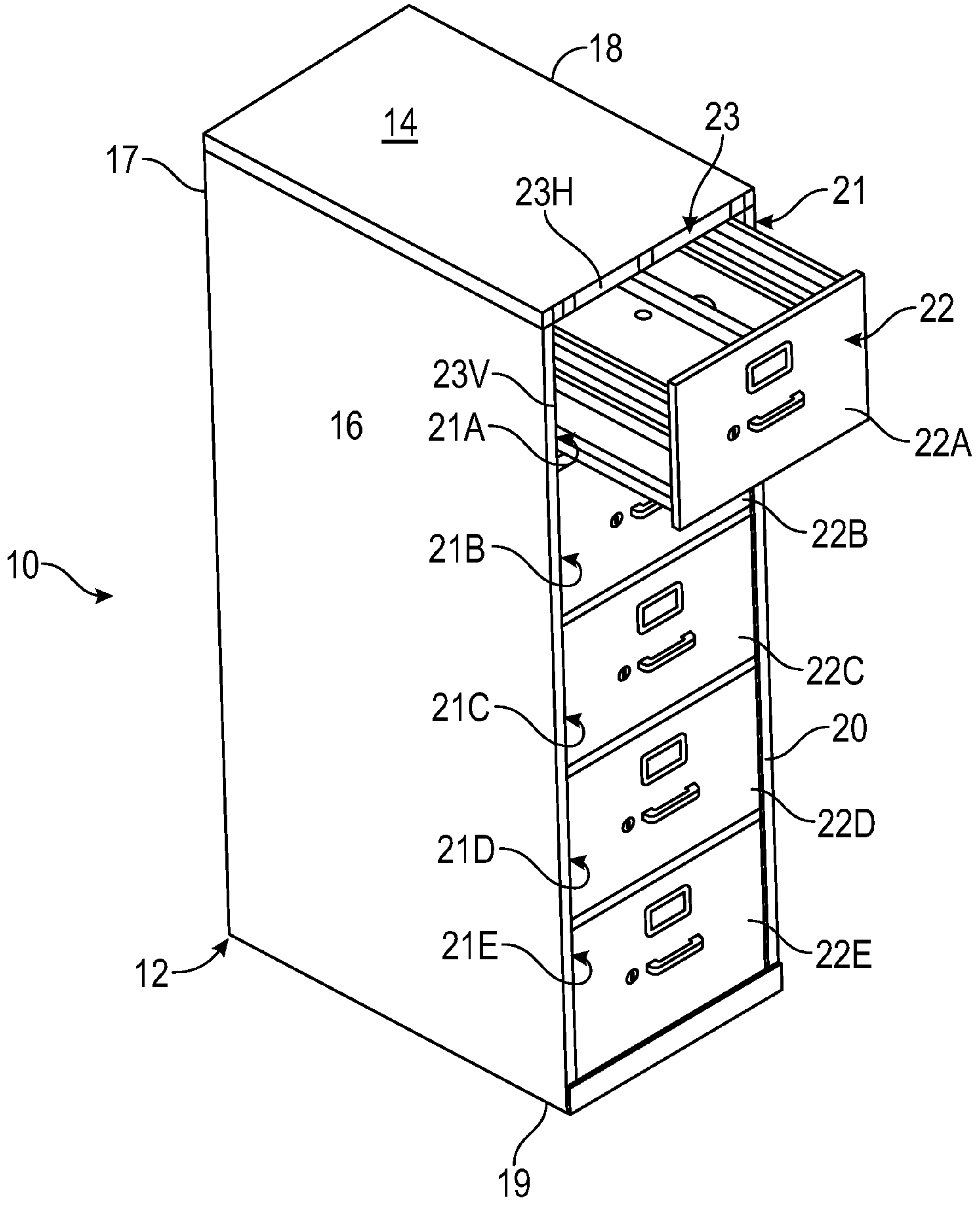
FIG. 1 is a perspective view of a file cabinet that is capable of being fitted with a tamper resistant hasp of the disclosed embodiments.

As illustrated in FIGS. 1-2, a file cabinet 10 of standard construction includes a housing 12, the housing includes a top wall 14, side walls 16 and 18, a bottom wall 19, a back wall 17, and a front panel 20. In the illustrated embodiment, the front panel 20 includes five openings 21A-21E (generally referenced as 21) through which can extend each of five file drawers, 22A-22E, respectively (generally referenced as 22). The front panel 20 has vertical and horizontal front lips 23V, 23H (generally referenced as 23) defined by vertical and horizontal portions of the front panel 20 that collectively surround the openings 21. The number of file drawers 22 in the cabinet 10 is not critical and can be greater or less than five.

As shown in FIG. 3, to secure contents in the drawers 22, a plurality of tamper resistant hasps 100A, 100B (each generally referred as the hasp 100) are provided. The one hasp (or a first hasp) 100A is secured to a lip 23 and another hasp (or a second hasp) 100B is secured to a drawer 22 that is being secured. Though the illustrated embodiment shows the one hasp 100A secured to the vertical lip 23V, this is not intended on limiting the application of the embodiments. In one embodiment, the hasp 100 is formed of steel. In one embodiment, the hasp 100 is additively manufactured. A lock 50, such as a pad lock with a shackle 60, may be utilized with the hasp 100 to lock the drawer 22 in a closed configuration.

Figure 6:
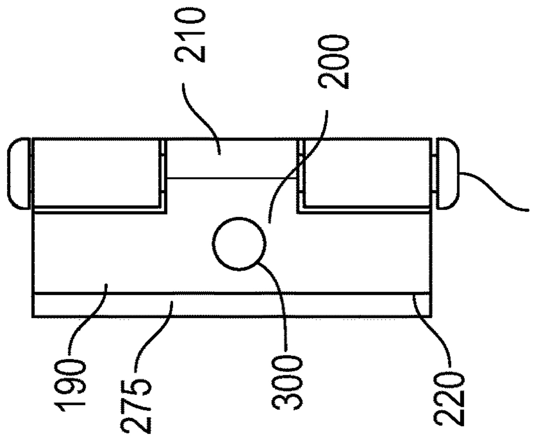
FIG. 6 is a second side view of the hasp in an opposite direction from FIG. 5.
Figure 5:
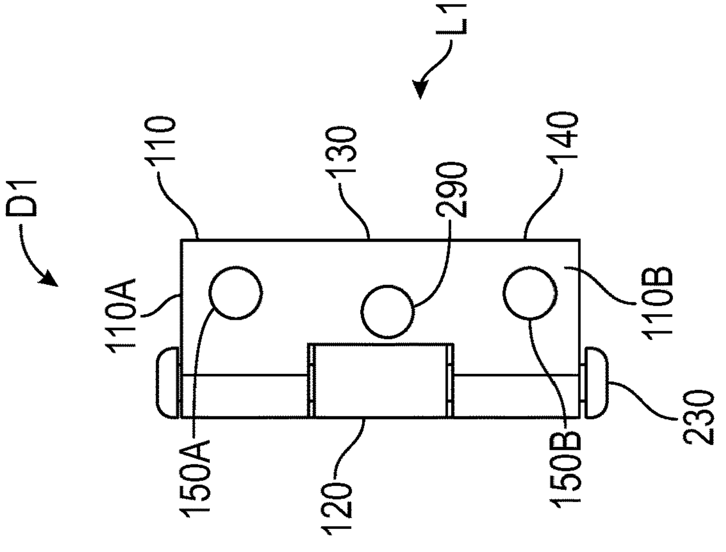
FIG. 5 is a first side view of the hasp.

Turing to FIGS. 4-6, additional deals of the hasp 100 are provided. The hasp 100 includes a first member 110 that extends between a first inner end 120 and a first outer end 130 that are depthwise spaced apart from each other by a first distance D1. The first member 110 defines a first member outer boundary 140 and has a mounting aperture 150 located within the first member outer boundary 140. As shown, the first member 110 has a plurality of the mounting apertures 150A, 150B located within the first member outer boundary 140 and are spaced apart from each other and located near opposite lengthwise ends 110A, 110B of the first member 110.

Figure 10:
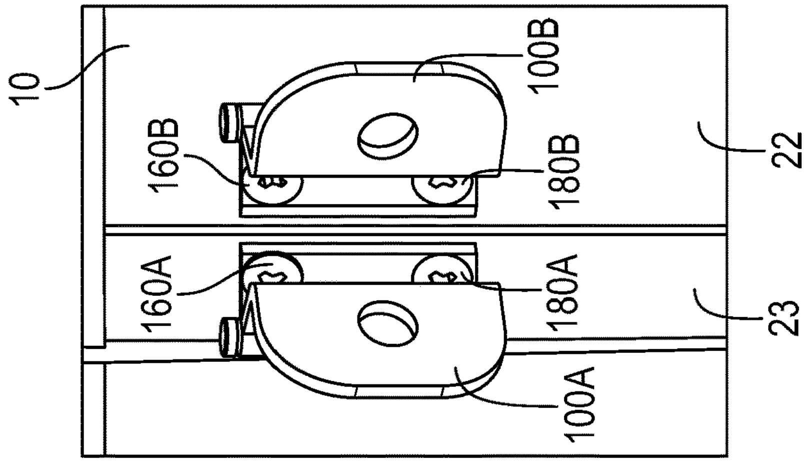
FIG. 10 shows the hasp connected to the file cabinet via mounting fasteners (screws)
Figure 11:
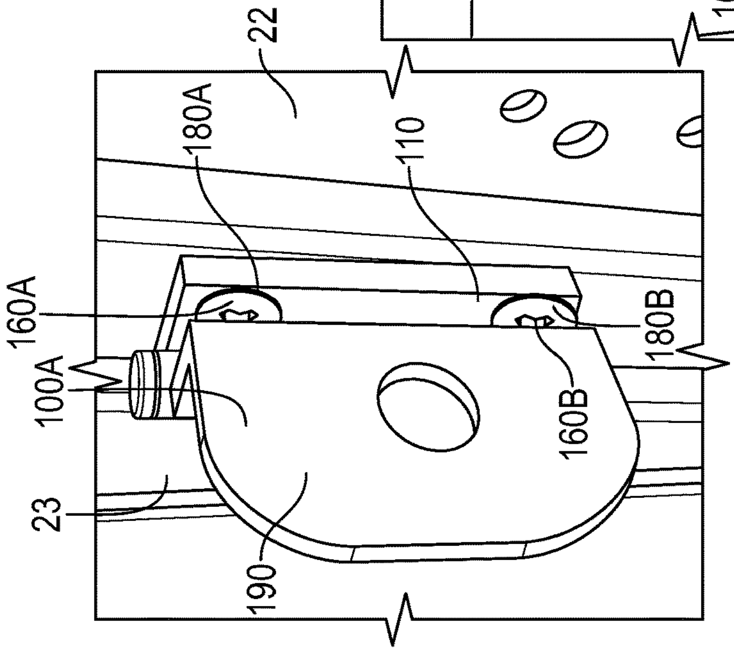
FIG. 11 shows the hasp connected to the file cabinet, with a security fastener (screw) connected to it.

As shown in FIGS. 10-11, mounting fasteners 160A, 160B, which may be mounting screws, with respective shafts (not shown) and heads 180A, 180B, such as self-tapping metal screws, may be utilized to mount the first member 110 to the cabinet 10. For example, when the mounting fasteners 160A, 160B are installed, the heads 180A, 180B of the mounting fasteners 160A, 160B rest against the first member 110 of the hasp 100.

Turing back to FIGS. 4-6, the hasp 100 includes a second member 190 that has a first portion 200 that extends between a second inner end 210 and a joint end 220 that are depthwise spaced apart from each other by substantially the first distance D1. The second inner end 210 is pivotally coupled to the first inner end 120. In one embodiment, the first inner end 120 and the second inner end 210 are pivotally coupled via a hinge 230. In one embodiment, the hinge 230 is a piano hinge.

According to an embodiment, the first member is a first plate that is rectangular and has a first length L1 that is greater than the first distance D1. The second member 190 is a second plate. The first portion 200 of the second member 190 has a length that is the same as the first length L1 of the first member 110. In one embodiment, the first portion 200 has an outer boundary 275 having substantially a same shape as the first member 110 so as to cover the first member 110 when pivoted against it.

Figure 12:
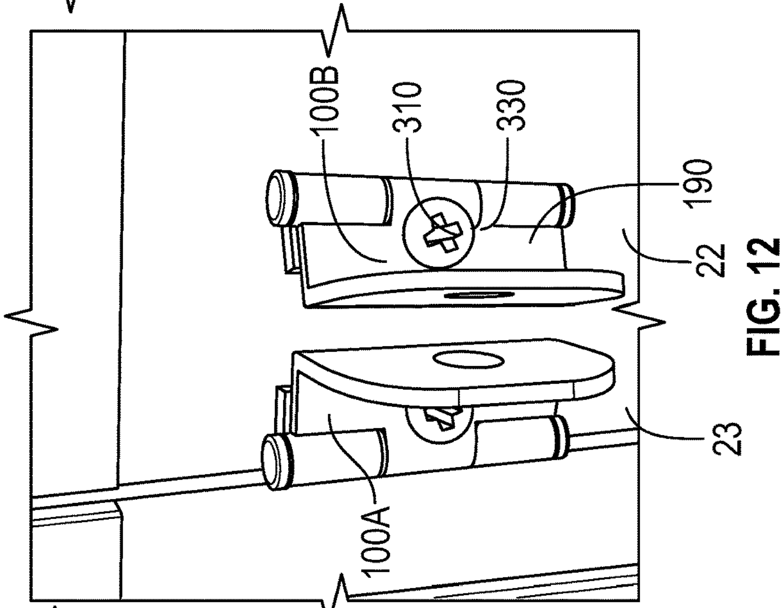
FIG. 12 shows two of the hasps connected to the file cabinet.

As shown in FIGS. 10-12, the second member 190 is configured to pivot relative to the first member 110 so that in a first pivot position (FIGS. 11 and 12), the first portion 200 is against the first member 110 and covers the mounting apertures 150A, 150B. Thus, in the first pivot position, the first portion 200 covers the mounting fasteners 160A, 160B, blocking access to them and preventing their removal. As such, and as discussed in greater detail below, this configuration enables the hasp 100 to be tamper resistant. In a second pivot position (FIG. 10), the first member 110 is at an angle to the first portion 200 and the mounting apertures 150A, 150B are uncovered, providing access to the mounting fasteners 160A, 160B.

Figure 7:
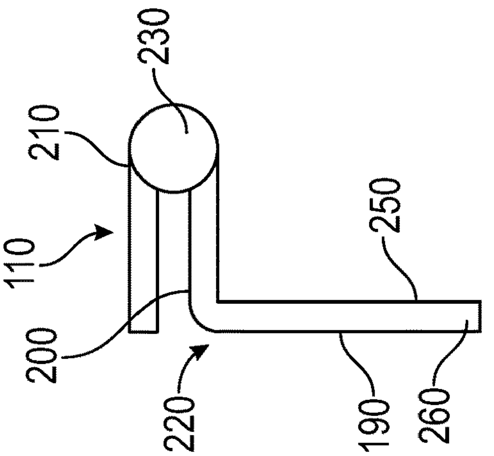
FIG. 7 is a top view of the hasp.
Figure 9:
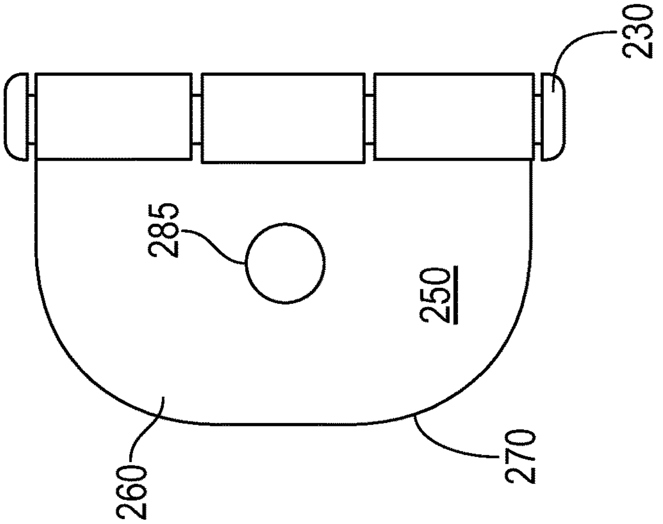
FIG. 9 is a front view of the hasp.
Figure 8:
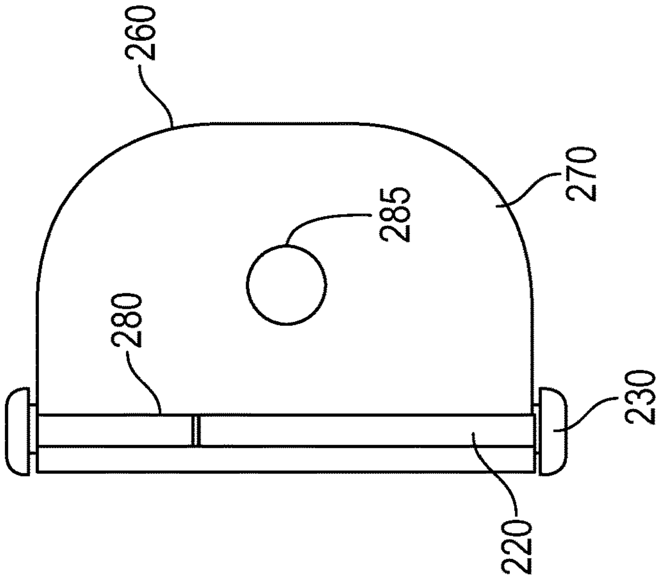
FIG. 8 is a rear view of the hasp.

Turning back to FIGS. 7-9, the second member 190 of the hasp 100 has a second portion 250 that extends away from the first portion 200 at the joint end 220 to a third end 260. According to an embodiment, the second portion 250 extends perpendicularly away from the first portion 200 at the joint end 220. When the second member 190 is in the first pivot position, the second portion 250 extends away from the first member 110. The second portion 250 defines a second portion outer boundary 270 and has a shackle aperture 285 located within the second portion outer boundary 270. In one embodiment, the second portion 250 is D-shaped to define an elongate flat end 280 at the joint end 220. As a result, the third end 260 of the second portion 250 is arcuate.

Turning back again to FIGS. 4-6, in one embodiment the shackle aperture 285 is aligned with a lengthwise center C1 of the first member 110, e.g., lengthwise intermediate of the mounting apertures 150A, 150B. The first member 110 has a first security aperture 290 that is lengthwise aligned with the shackle aperture 285 and is therefore also offset from the mounting apertures 150A, 150B. The first portion 200 of the second member 190 has a second security aperture 300 that is positioned to overlap, e.g., align, with the first security aperture 290 when the second member 190 is in the first pivot position.

As shown in FIG. 12, a security fastener 310 such as a screw, with a shaft (not shown) and head 330, that may be similar to the mounting screws, can be used to secure the second member 190 against the first member 110 via the security apertures 290, 300. This secures the second member 190 against the first member 110 to securely conceal the mounting apertures 150A, 150B.

Figure 13:
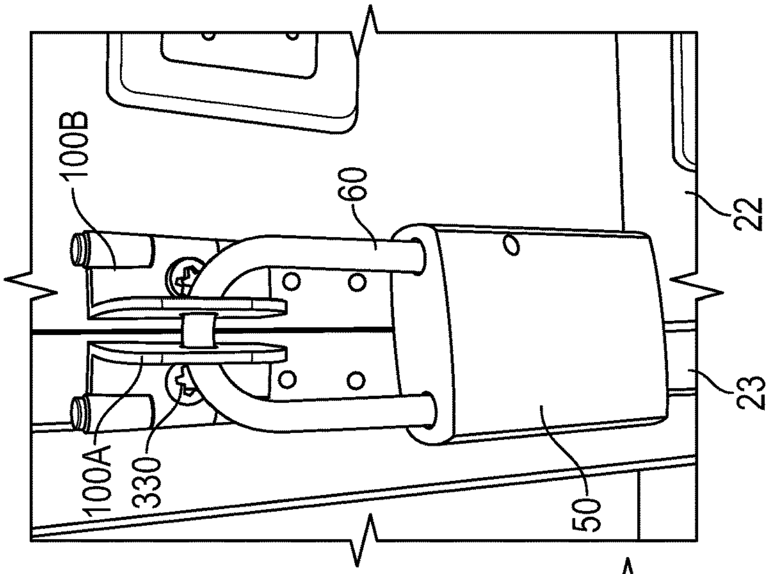
FIG. 13 shows a pad lock locking the file cabinet via the hasps.

Turning to FIG. 13, due to the alignment between the security apertures 290, 300 and the shackle aperture 285, when a shackle 60 of a lock 50, such as a padlock, is passed through the security apertures 290, 300, access to the head of the security fastener is blocked by it. As a result, the security fastener 310 is inaccessible, and therefore the mounting fasteners are inaccessible due to the second member 190 being securely against the first member. In this configuration, the hasp 100 is tamper resistant.

Figure 14:
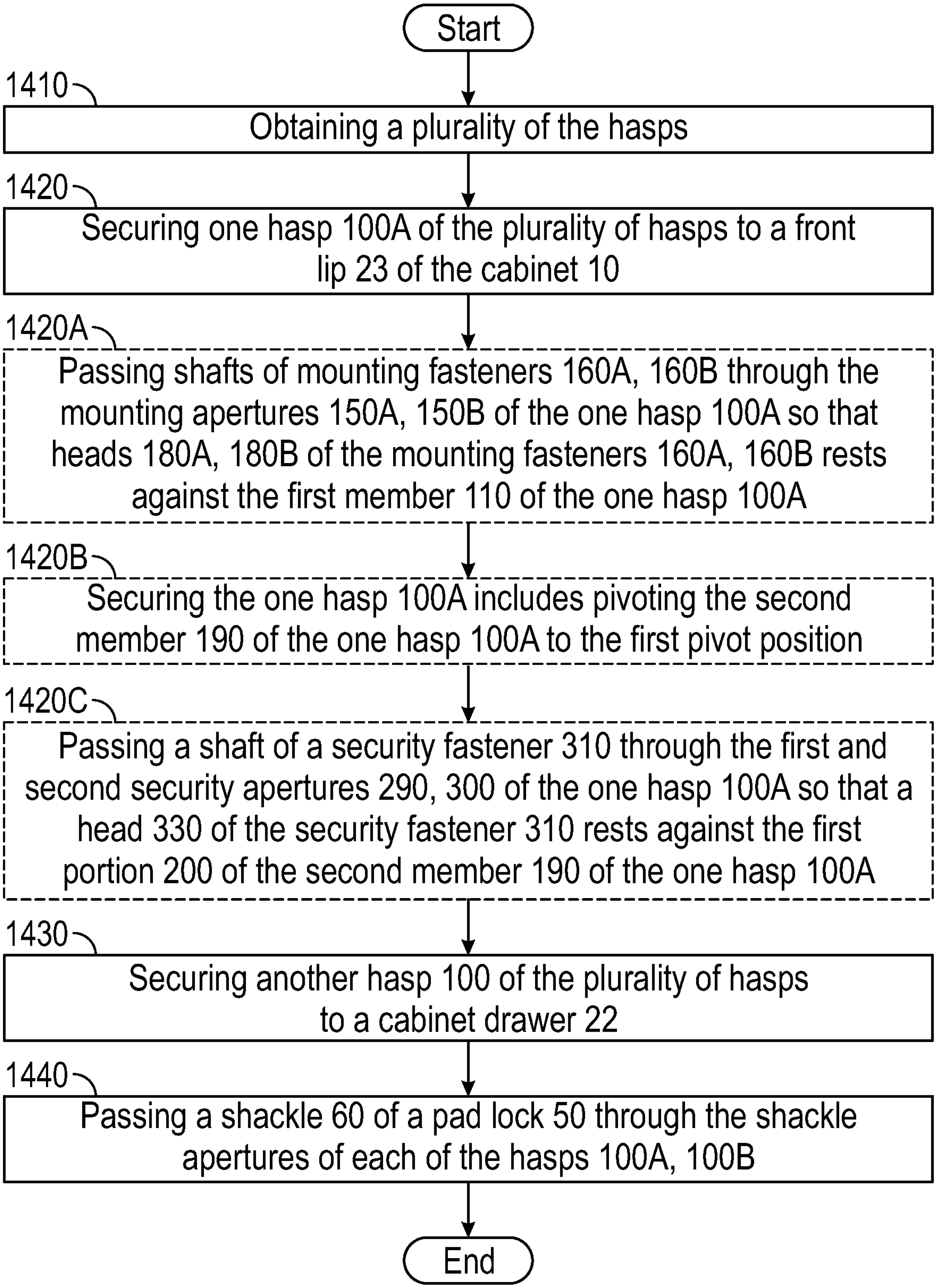
FIG. 14 is a flowchart showing a method of securing a cabinet.

Turning to FIG. 14, a flowchart shows a method of securing a cabinet 10. As shown in block 1410, the method includes obtaining a plurality of the hasps. As shown in block 1420, the method includes securing one hasp 100A of the plurality of hasps to a front lip 23 of the cabinet 10. As shown in block 1420A, securing the one hasp 100A includes passing shafts of mounting fasteners 160A, 160B through the mounting apertures 150A, 150B of the one hasp 100A so that heads 180A, 180B of the mounting fasteners 160A, 160B rests against the first member 110 of the one hasp 100A.

As shown in block 1420B, securing the one hasp 100A includes pivoting the second member 190 of the one hasp 100A to the first pivot position. This configuration covers the heads 180A, 180B of the mounting fasteners 160A, 160B, and aligns the first and second security apertures 290, 300 of the one hasp 100A. As shown in block 1420C, securing the one hasp 100A includes passing a shaft of a security fastener 310 through the first and second security apertures 290, 300 of the one hasp 100A so that a head 330 of the security fastener 310 rests against the first portion 200 of the second member 190 of the one hasp 100A.

As shown in block 1430, the method includes securing another hasp 100 of the plurality of hasps to a cabinet drawer 22. The another hasp 100B is secured the same way that one hasp 100A is secured. As shown in block 1440, the method includes passing a shackle 60 of a pad lock 50 through the shackle apertures of each of the hasps 100A, 100B. This configuration block access to the head 320 of the security fastener 310. As indicated, the mounting fasteners 160A, 160B and security fastener 310 are self-taping metal screws.

Figure 15:
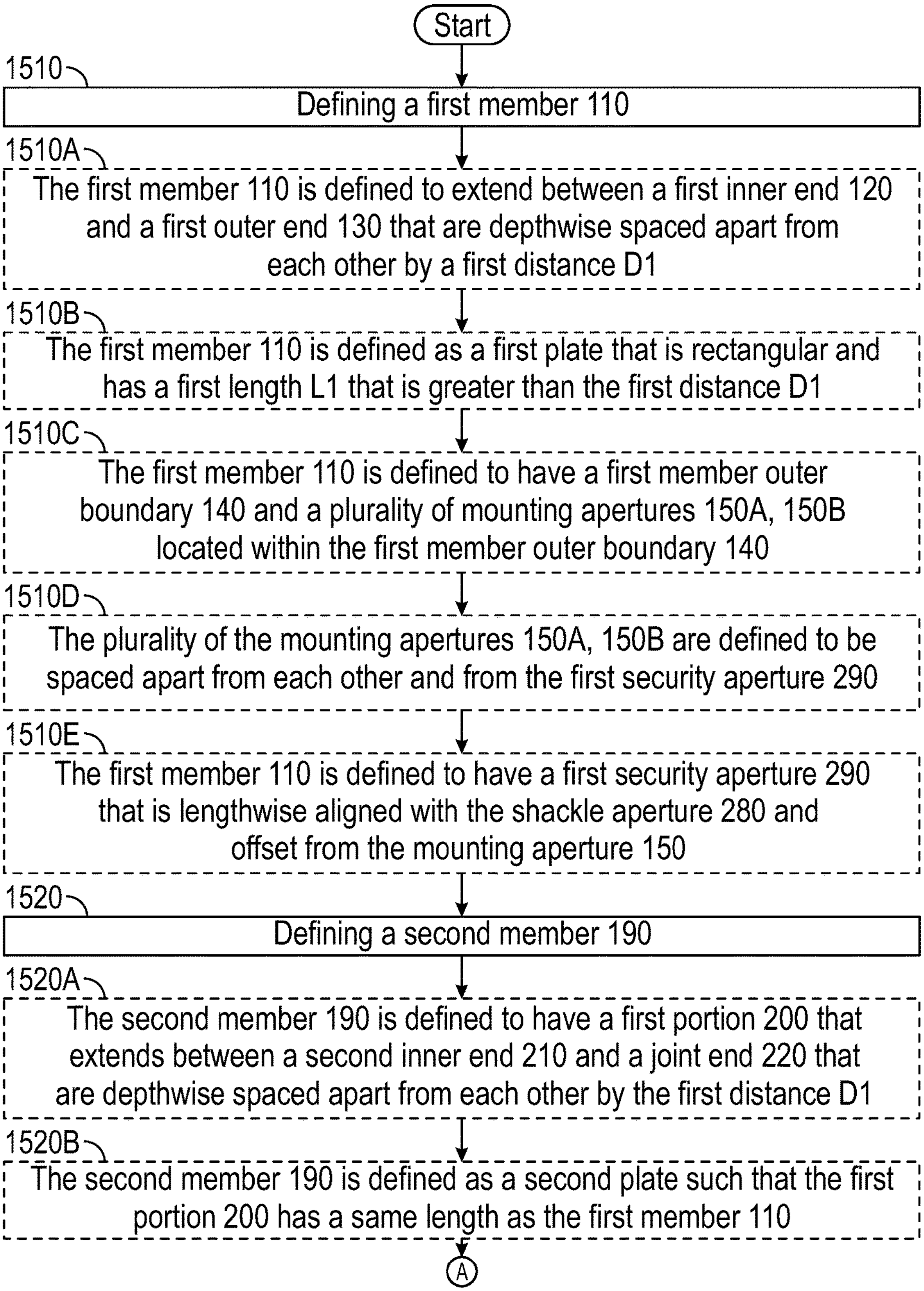
FIG. 15 is a flowchart showing a method of manufacturing a tamper resistant hasp.
Figure 15:
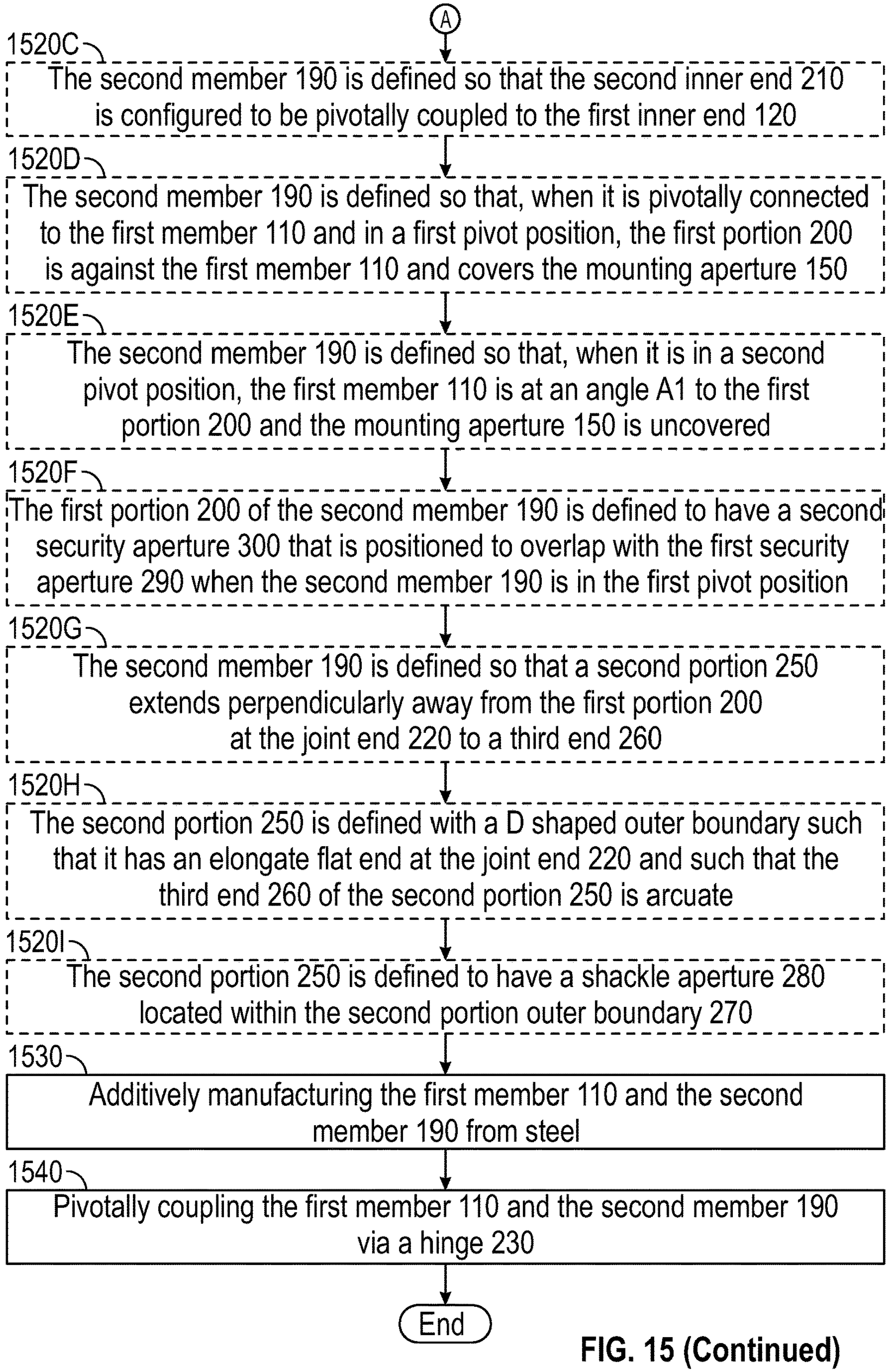

Turning to FIG. 15, a flowchart shows a method of manufacturing a tamper resistant hasp 100. As shown in block 1510, the method includes defining a first member 110. Block 1510 is further defined by additional steps. For example, as shown in block 1510A, the first member 110 is defined to extend between a first inner end 120 and a first outer end 130 that are depthwise spaced apart from each other by a first distance D1. As shown in block 1510B, the first member 110 is defined as a first plate that is rectangular and has a first length L1 that is greater than the first distance D1. As shown in block 1510C, the first member 110 is defined to have a first member outer boundary 140 and a plurality of mounting apertures 150A, 150B located within the first member outer boundary 140. As shown in block 1510D, the plurality of mounting apertures 150A, 150B are defined to be spaced apart from each other and from the first security aperture 290. As shown in block 1510E, the first member 110 is defined to have a first security aperture 290 that is lengthwise aligned with the shackle aperture 285 and offset from the mounting aperture 150.

As shown in block 1520, the method includes defining a second member 190. Block 1520 is further defined by additional steps. For example, as shown in block 1520A, the second member 190 is defined to have a first portion 200 that extends between a second inner end 210 and a joint end 220 that are depthwise spaced apart from each other by the first distance D1. As shown in block 1520B, the second member

190 is defined as a second plate such that the first portion 200 has a same length as the first member 110. As shown in the block 1520C, the second member 190 is defined so that the second inner end 210 is configured to be pivotally coupled to the first inner end 120.

As shown in block 1520D, the second member 190 is defined so that, when it is pivotally connected to the first member 110 and in a first pivot position, the first portion 200 is against the first member 110 and covers the mounting aperture 150. As shown in block 1520E, the second member 190 is defined so that, when it is in a second pivot position, the first member 110 is at an angle to the first portion 200 and the mounting aperture 150 is uncovered. As shown in block 1520F, the first portion 200 of the second member 190 is defined to have a second security aperture 300 that is positioned to overlap with the first security aperture 290 when the second member 190 is in the first pivot position. As shown in the block 1520G, the second member 190 is defined so that a second portion 250 extends perpendicularly away from the first portion 200 at the joint end 220 to a third end 260.

As shown in block 1520H, the second portion 250 is defined with a D-shaped outer boundary 270 such that it has an elongate flat end at the joint end 220 and such that the third end 260 of the second portion 250 is arcuate. As shown in block 1520I, the second portion 250 is defined to have a shackle aperture 285 located within the second portion outer boundary 270.

As shown in block 1530, the method includes additively manufacturing the first member 110 and the second member 190 from steel. As shown in block 1540, the method includes pivotally coupling the first member 110 and the second member 190 via a hinge 230.

As indicated above, with the above configuration, when the second member 190 is pivotally connected to the first member 110 and disposed in the first pivot position, the first portion 200 of the second member 190 covers the plurality of the mounting apertures 150A, 150B. As a result, the hasp 100 is tamper resistant.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

I claim:

1. A tamper resistant hasp comprising:

a first member that extends between a first inner end and a first outer end that are depthwise spaced apart from each other by a first distance, wherein the first member defines a first member outer boundary and has a mounting aperture located within the first member outer boundary;

a second member that has:

a first portion that extends between a second inner end and a joint end that are depthwise spaced apart from each other by the first distance, wherein the second inner end is pivotally coupled to the first inner end, wherein the second member is configured to pivot relative to the first member so that in a first pivot position the first portion is against the first member and covers the mounting aperture, and in a second pivot position the first member is at an angle to the first portion and the mounting aperture is uncovered; and a second portion that extends away from the first portion at the joint end to a third end, so that when the second member is in the first pivot position, the second portion extends away from the first member, whereby the second member defines a singular bend, between the first and second portions, wherein the second portion defines a second portion outer boundary and has a shackle aperture located within the second portion outer boundary;

wherein:

the first inner end and the second inner end are pivotally coupled via a hinge;

wherein:

except at the pivotal coupling between the first member and the second member and the singular bend in the second member:

the first member, the first portion of the second member and the second portion of the second member each are entirely formed and shaped as a planar flat plate;

wherein:

the first member has a first security aperture that is lengthwise aligned with the shackle aperture and offset from the mounting aperture; and the first portion of the second member has a second security aperture that is positioned to overlap with the first security aperture when the second member is in the first pivot position;

wherein:

the first member has a plurality of the mounting apertures located within the first member outer boundary; and the plurality of the mounting apertures are spaced apart from each other and the first security aperture so that in the first pivot position, the first portion of the second member covers the plurality of the mounting apertures; and wherein:

each of the mounting apertures and security aperture has a same sized circular profile; and the hasp includes a plurality of screws that are the same as each other and fit within and extend through respective overlayed ones of the mounting apertures in the security apparatus.

2. The hasp of claim 1, wherein:

the second portion extends perpendicularly away from the first portion at the joint end.

3. The hasp of claim 1, wherein:

the first member is a first plate that is rectangular and has a first length that is greater than the first distance; and the second member is a second plate, wherein the first portion has a same length as the first member.

4. The hasp of claim 1, wherein:

the second portion is D-shaped to define an elongate flat end at the joint end and wherein the third end of the second portion is arcuate.

5. The hasp of claim 1, wherein:

the shackle aperture is aligned with a lengthwise center of the first member.

6. The hasp of claim 1, wherein:

the hasp is formed of steel.

7. A method of securing a cabinet, comprising:

(i) obtaining a plurality of the hasps of claim 6;

(ii) securing one hasp of the plurality of hasps to a front lip of the cabinet via:

passing a shaft of a mounting fastener through the mounting aperture of the one hasp so that a head of the mounting fastener rests against the first member of the one hasp;

pivoting the second member of the one hasp to the first pivot position, to thereby cover the head of the mounting fastener, and to align the first and second security apertures of the one hasp;

passing a shaft of a security fastener through the first and second security apertures of the one hasp so that a head of the security fastener rests against the first portion of the second member of the one hasp;

(iii) securing another hasp of the plurality of hasps to cabinet drawer; and (iv) passing a shackle of a pad lock through the shackle aperture of each of the hasps, to thereby block access to the security fastener.

8. The method of claim 7, wherein:

the mounting fastener and the security fastener are self-taping metal screws.

9. A method of manufacturing a tamper resistant hasp, comprising:

defining a first member to extend between a first inner end and a first outer end that are depthwise spaced apart from each other by a first distance, and to have a first member outer boundary and a mounting aperture located within the first member outer boundary;

defining a second member to have:

a first portion that extends between a second inner end and a joint end that are depthwise spaced apart from each other by the first distance, wherein the second inner end is configured to be pivotally coupled to the first inner end, wherein the second member is defined so that, when it is pivotally connected to the first member and in a first pivot position, the first portion is against the first member and covers the mounting aperture, and when it is in a second pivot position, the first member is at an angle to the first portion and the mounting aperture is uncovered; and a second portion that extends away from the first portion at the joint end to a third end, the second portion being defined so that when the second member is pivotally connected to the first member and disposed in the first pivot position, the second portion extends away from the first member, whereby the second member defines a singular bend, between the first and second portions, wherein the second portion is defined to have a second portion outer boundary and have a shackle aperture located within the second portion outer boundary;

wherein:

the first inner end and the second inner end are pivotally coupled via a hinge;

wherein:

except at the pivotal coupling between the first member and the second member and the singular bend in the second member:

the first member, the first portion of the second member and the second portion of the second member each are entirely formed and shaped as a planar flat plate;

wherein:

the first member has a first security aperture that is lengthwise aligned with the shackle aperture and offset from the mounting aperture; and the first portion of the second member has a second security aperture that is positioned to overlap with the first security aperture when the second member is in the first pivot position;

wherein:

the first member has a plurality of the mounting apertures located within the first member outer boundary; and the plurality of the mounting apertures are spaced apart from each other and the first security aperture so that in the first pivot position, the first portion of the second member covers the plurality of the mounting apertures; and wherein:

each of the mounting apertures and security aperture has a same sized circular profile; and the hasp includes a plurality of screws that are the same as each other and fit within and extend through respective overlayed ones of the mounting apertures in the security apparatus;

additively manufacturing the first member and the second member; and pivotally coupling the first member and the second member.

10. The method of claim 9, wherein:

the first and second members are additively manufactured from steel.

11. The method of claim 9, wherein:

the second portion is defined to extend perpendicularly away from the first portion at the joint end.

12. The method of claim 9, wherein:

the first member is defined as a first plate that is rectangular and has a first length that is greater than the first distance; and the second member is defined as a second plate, such that the first portion has a same length as the first member.

13. The method of claim 9, wherein:

the second portion is defined as being D-shaped such that it has an elongate flat end at the joint end and such that the third end of the second portion is arcuate.

* * * * *